United States Patent [19]

Hummel et al.

[11] Patent Number: 5,083,643
[45] Date of Patent: Jan. 28, 1992

[54] NOISE ABATING BRAKE SHOE

[75] Inventors: Alan R. Hummel, Winchester; David L. Swadley, Stephens City, both of Va.

[73] Assignee: Abex Corporation, Newton, Mass.

[21] Appl. No.: 587,735

[22] Filed: Sep. 25, 1990

Related U.S. Application Data

[62] Division of Ser. No. 419,487, Oct. 10, 1989.

[51] Int. Cl.$^5$ ............................................. F16D 69/00
[52] U.S. Cl. ................................. 188/251 A; 267/136; 524/440
[58] Field of Search ............ 188/73.1, 251 A, 251 M, 188/250 B, 250 E; 192/107 M; 267/136; 524/153, 440

[56] References Cited

U.S. PATENT DOCUMENTS

| | | | |
|---|---|---|---|
| 3,885,651 | 5/1975 | Odier | 188/73.5 |
| 4,219,152 | 8/1980 | Littlefield | 188/251 A X |
| 4,268,467 | 5/1981 | Wagner | 264/313 X |
| 4,373,038 | 2/1982 | Moraw et al. | 524/440 X |
| 4,388,423 | 6/1983 | Kaufman et al. | 524/450 X |
| 4,743,634 | 5/1988 | Royer | 192/107 M X |

FOREIGN PATENT DOCUMENTS

| | | | |
|---|---|---|---|
| 2225977 | 6/1973 | Fed. Rep. of Germany | 188/250 E |
| 1206426 | 9/1970 | United Kingdom | 188/73.37 |

*Primary Examiner*—Robert J. Oberleitner
*Assistant Examiner*—Lee W. Young
*Attorney, Agent, or Firm*—Thomas S. Baker, Jr.

[57] ABSTRACT

A noise abating automotive brake shoe assembly consisting essentially of a mixture of from about 2 to about 30 percent by weight of a discrete, heat-cured, particulate, elastomeric, sound damping material containing cashew nut shell resin, nitrile rubber, resin binder, a fiber selected from a group consisting of metal, glass, mineral rock wool and refractory with the remainder being friction material ingredients.

15 Claims, 1 Drawing Sheet

NOISE ABATING BRAKE SHOE

BACKGROUND OF THE INVENTION

This application is a division of patent application Ser. No. 07/419,487 filed Oct. 10, 1989.

For some time automotive manufacturers have been aware that the application of disc or drum brakes to slow or stop a vehicle may cause a significant amount of noise to emanate from the vehicle. It has been learned that such noise originates at the interface of a brake drum and a friction material brake block or at the interface of a rotor and the friction material of a disc brake pad during the braking application. During such application a resonance develops at the friction material brake drum or rotor interface which may be transmitted through the brake shoe assembly, the brake mounting hardware and into the suspension to cause objectionable noise to emanate from the vehicle.

Numerous attempts have been made to reduce the resonance vibration imparted during the braking operations. In vehicles equipped with disc brakes in which a disc brake pad engages a rotor, resonant vibrations have been reduced by providing a resilient coating at the interface between a disc brake pad backing plate and a caliper piston. Unfortunately, a conventional drum brake mechanism does not lend itself to such a solution. In an attempt to reduce the aforementioned resonant vibrations it has been the practice to stiffen certain brake and suspension system components to reduce their susceptibility to developing sympathetic resonant vibrations. Attempts to stiffen such systems have included casting ribs on the exterior surface of a brake drum to stiffen the drum, casting brake drums with a heavy ring of metal around the edge of the open end of the drum to stiffen the drum and welding supports on the suspension system to more firmly anchor suspension components to reduce their ability to transmit and/or amplify vibrations. Additionally, heavy rubber bands sometimes are secured to the exterior surface of brake drums in an attempt to reduce the vibrations transmitted therethrough. Unfortunately, none of the aforementioned mentions provide a definitive solution to the problem applicable to all vehicles.

Large vehicles such as trucks and busses are particularly susceptible to the generation of excessive noise during the braking process and the aforementioned attempts to reduce the resonance emanating from the brake drum friction material interface have been least successful in these applications.

Accordingly, it is desirable to provide an automotive brake shoe assembly which is capable of interrupting and reducing the noise carrying vibrations originating at the friction material/brake drum interface during the braking application. It has been found desirable to interrupt these noise transmitting vibrations as close to this interface as possible.

SUMMARY OF THE INVENTION

The present invention provides a noise abating friction material block for an automotive brake shoe assembly comprising a mixture of a particulate elastomeric sound damping material and conventional automotive friction material ingredients.

The present invention also provides a noise abating automotive brake shoe assembly having a metal brake shoe with a flat shoe table for supporting a friction material brake block, a friction material brake block having an inside diameter which faces the shoe table and a thin layer of elastomeric sound damping material interposed between the shoe table of the brake shoe and the inside diameter of the brake block to resiliently support said brake block on said shoe table to reduce noise causing resonants between said brake shoe and said brake block.

DESCRIPTION OF THE INVENTION

It has been learned that objectionable noise causing vibrations originate at the interface of the outer diametral surface of a friction material brake block and the mating surface of a brake drum during the braking process. A resonance occurs as the vibrations are transmitted through the metal brake shoe assembly to brake mounting hardware and thereafter to suspension components of the vehicle. It has been found that the objectionable noise causing vibrations most effectively can be reduced by damping the resonant vibrations as close to the origin as possible. As a result of this discovery, a noise abating friction material block has been developed pursuant to the subject invention.

Figure 1:
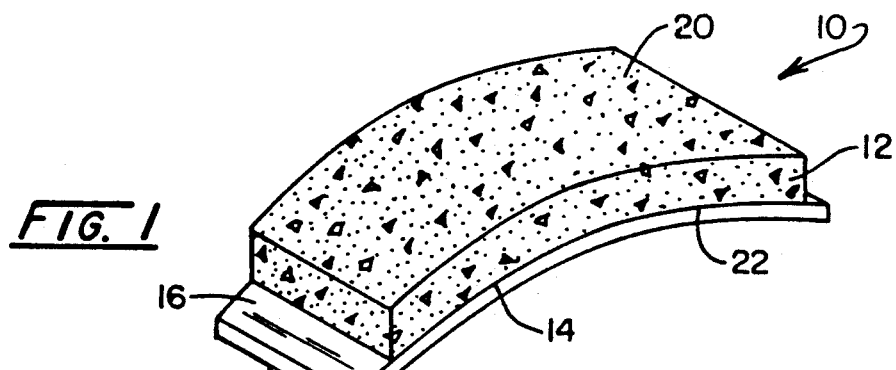
FIG. 1 illustrates a noise abating friction material block mounted on the shoe table of a metal brake shoe.

Turning to FIG. 1, a brake shoe assembly (10) incorporates a noise abating friction material brake block (12) and a metal brake shoe (14). The brake shoe includes an arcuate flat shoe table (16) adapted to mount the brake block (12) and a perpendicular shoe web (18) which extends from the shoe table and acts to reinforce the shoe table and to provide abutments for a brake actuating mechanism not shown. The brake block (12) has an outer diameter surface (20) adapted to engage a complimentary surface on a brake drum not shown and an inside diameter surface (22) which mounts on the shoe table (16). The brake block (12) of the present invention may be attached to the brake shoe (14) by an adhesive at the interface of the brake shoe and the brake block which may be cured by a combination of increased temperature and pressure or it may be attached by rivets or by bolts not shown.

In the embodiment of the invention depicted in FIG. 1, the brake block (12) functions to prevent the transmission and resonance of noise causing vibrations originating at the interface of the outer diameter surface (20) of the brake block (12) and a brake drum not shown. The brake block (12) of the present invention incorporates a mixture of a particulate elastomeric sound damping material and conventional automotive friction material ingredients. The preferred formulation for the elastomeric sound damping material particles comprises about 2 to 15 percent by weight cured cashew nut shell resin, 5 to 25 percent by weight of nitrile rubber particles, 8 to 30 percent resin binder system, 4 to 20 percent fibers, 5 to 18 percent carbon materials and 20 to 40 percent fillers. It has been found that the resin binder system may be phenolic or cashew. Additionally, the fibers may be glass, rock wool, processed mineral fibers or a refractory material fiber. The carbon materials may be graphite, coke, coal particles, carbon black or any combination or descendent thereof. With respect to fillers, calcium carbonate and barium sulphate have been found to be economical and acceptable.

In the manufacture of the elastomeric sound damping material for the brake shoe of the present invention, the elements described above are mixed using conventional commercial mixing techniques and equipments. Thereafter the mix is extruded utilizing conventional equipment into a desired shape. Thereafter, the extruded mix shapes are cured by being subjected to a pre-cure cycle of soaking for ten hours in air at 250° F. followed by soaking in air for three hours at 400° F. Thereafter, the extruded mix shapes are converted into particles ranging in size from six to two hundred mesh using equipment such as a hammermill.

The elastomeric sound damping particles are added to the elements comprising a desired automotive friction material mix. The sound damping material addition preferably ranges from 2 to 30 percent by weight. The elastomeric sound damping material particles are mixed with those of the friction material in such a way as to make the brake block a homogeneous element as near as possible. After the elastomeric sound damping material particles are added to the components comprising the friction material ingredients, the components are mixed, pre-cured and cured in the same manner as any conventional automotive friction material. Additionally, the brake block may be ground to any desired shape to create a desired brake block. Thereafter the brake block would be mounted on a metal brake shoe to provide a brake shoe assembly.

Although the exact operation of the elastomeric sound damping material particles within the automotive friction material to reduce the noise occurring during braking of a vehicle are not fully understood, it has been suggested that the elastomeric particles inhibit development of a noise causing vibrational frequency within the friction material brake block itself. Additionally, it has been suggested that the elastomeric sound damping material particles also function to add a degree of resilience to the friction material block at the interface of the inside diameter surface and the table of the metal brake shoe when the elements are assembled.

When the sound damping material particles are added to conventional automotive friction material ingredients in the preferred range of 2 to 30 percent by weight it has been found that good wear characteristics of the brake block are maintained and appropriate governmental approval of the brake block may be obtained.

Although the noise abating friction material block (12) described in connection with FIG. 1 has been found to provide a brake shoe assembly having suitable wear and performance characteristics, there are some applications where it would be preferable to utilize a brake shoe assembly having a brake block manufactured from conventional automotive friction material ingredients without the addition of elastomeric sound damping material particles. In these applications, it has been found that the addition of a separate elastomeric sound damping material element formed from the same ingredients as the particles introduced into the noise abating friction material brake block described in connection with FIG. 1 may be interposed between the table of a metal brake shoe and a conventional friction material brake block to provide an effective noise abating brake shoe assembly.

Figure 3:
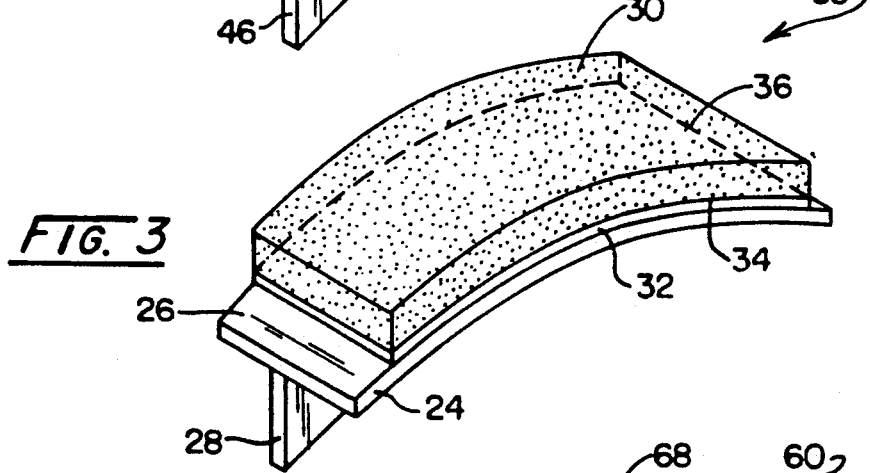
FIG. 3 depicts a noise abating automatic brake shoe assembly in which a sheet of elastomeric sound damping material is interposed between a friction material brake block and the shoe table of a metal brake shoe and FIG. 4 shows a noise abating automotive brake shoe assembly in which a plurality of laterally extending elastomeric sound damping segments are received in grooves formed in a friction material brake block and mounted between the brake block and the shoe table of a metal brake shoe.

Turning to FIG. 3, it may be seen that a metal brake shoe (24) having a shoe table (26) and a reinforcing shoe web (28) mounts a brake block (30) manufactured from conventional automotive friction material ingredients to provide a brake shoe assembly (38). However, in this embodiment of the invention a thin layer (32) of the extruded elastomeric sound damping material described above is interposed between the shoe table (26) and the inside diameter surface (34) of the brake block (30). The layer of elastomeric sound damping material resiliently supports the brake block on the shoe table and functions to prevent the transmission and resonance of noise causing vibrations which are developed at the interface of the outside diameter surface (36) of the brake block and a brake drum not shown. In FIG. 3, no bolts or rivets are shown as attaching the brake block (30) to the brake shoe (24) with the sound damping material layer therebetween. Instead, FIG. 3 illustrates the use of an adhesive at the interface of the inside diameter surface (34) and the elastomeric sound damping layer (32) and at the interface of the shoe table (26) and the sound damping layer (32). In a typical assembly procedure, the cement would be added to the appropriate layers and the brake shoe assembly would be subjected to a combination of heat and pressure to cure the cement.

It has been found that brake shoe assemblies which are assembled utilizing rivets or bolts exhibit the same acceptable noise abating characteristics as the brake shoe assembly depicted in FIG. 3 where cement has been utilized to assemble the elements.

Figure 2:
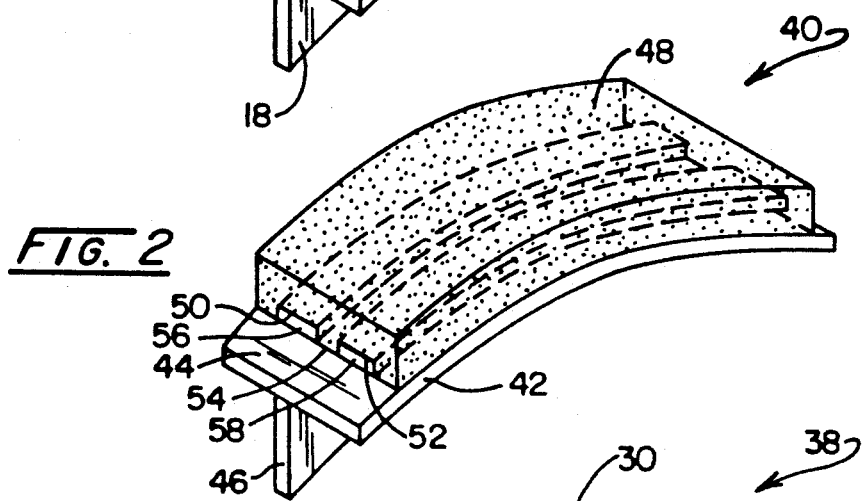
FIG. 2 illustrates a noise abating automotive brake shoe assembly in which an elastomeric sound damping material lies in longitudinally extending grooves and resiliently supports a brake block on the shoe table of a metal brake shoe.
Figure 4:
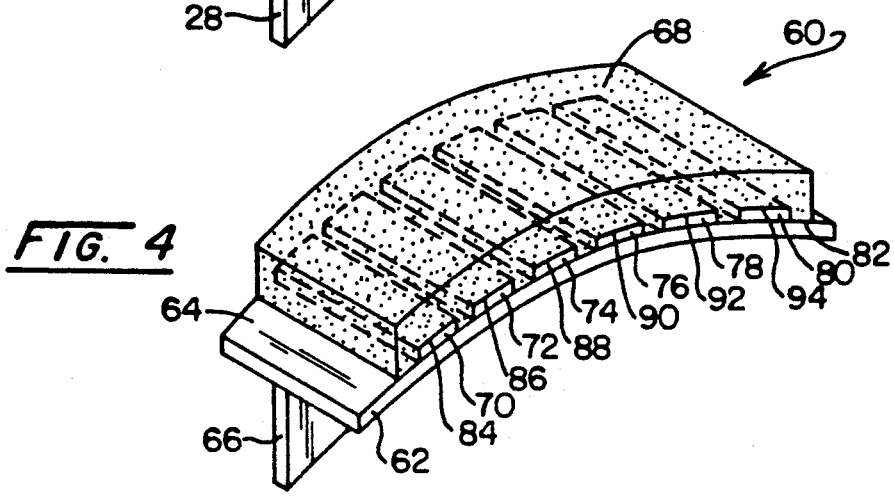

FIGS. 2 and 4 also depict embodiments of the invention in which segments of thin layers of the elastomeric sound damping material are interposed between a metal brake shoe and a conventional brake block to provide a brake shoe assembly which reduces noise causing resonance between the brake block and the brake shoe.

In FIG. 2, the brake shoe assembly (40) includes a metal brake shoe (42) having a shoe table (44) and a reinforcing shoe web (46). A brake block (48) manufactured from a conventional automotive friction material comprises a second major component of the brake shoe assembly (40). However, a pair of grooves (50 and 52) are formed in the inside diameter surface (54) of the brake block (48). A pair of elastomeric sound damping segments (56 and 58) are received within the grooves (50 and 52) respectively. The thickness of the elastomeric sound damping segments equals the depth of the grooves (50 and 52). These segments interrupt the transmission of resonant frequencies from the brake block (48) to the metal brake shoe (42).

In the embodiment depicted in FIG. 2, the brake block, the resilient sound damping segments (54 and 58) and the shoe table (44) are bonded together using an adhesive in the same manner as described in connection with the embodiment depicted in FIG. 3. Of course, rivets and bolts also could be used to attach the brake block (48) to the brake shoe (42). Where bolts or rivets are used to assemble the elements, it is preferred that the bolts and rivets engage only the shoe table and the brake block (48) and not pass through the elastomeric sound damping segments (56 and 58). Although two segments are depicted in the embodiment set forth in FIG. 2, it has been found that a single wide longitudinally extending segment also would function in an acceptable manner. Additionally, more than two longitudinally extending segments may be inserted between the brake shoe and the brake block to provide a brake shoe assembly having acceptable noise abating characteristics.

In FIG. 2, the elastomeric sound damping segments (54 and 58) were depicted as extending in a direction longitudinally of the inside diameter surface of the brake block (48). However, it has been found that the elastomeric sound damping segment also may extend laterally of the inside diameter surface of a brake block.

Turning to FIG. 4, the brake shoe assembly (60) may be seen to include a metal brake shoe (62) having a flat longitudinally extending shoe table (64) and a perpendicular reinforcing web (66). Additionally, it includes a brake block (68) manufactured from conventional automotive friction material ingredients. However, in this embodiment a plurality of laterally extending grooves (70 through 80) have been formed in the inside diameter surface (82) of the brake block (68). A plurality of elastomeric sound damping segments (84 through 94) are received within the grooves (70 through 80) respectively. Again, the segments (84 through 94) have a thickness approximately equal to the depth of the grooves (70 through 80). Additionally, in the embodiment depicted in FIG. 4, an adhesive has been utilized to assemble the brake shoe assembly (60) components in the same manner as described in connection with the embodiments depicted in FIGS. 2 and 3. Of course, bolts or rivets also could be utilized to affix the brake block (68) to the metal brake shoe (62).

Since certain changes may be made to the above described apparatus, system and method without departing from the scope of the invention herein, it is intended that all matter contained in the description thereof or shown in the accompanying drawings shall be interpreted as illustrative and not in a limiting sense.

We claim:

1. An elastomeric sound damping material incorporated as discrete, heat-cured particles in a brake shoe and consisting essentially of from about 2 to about 15 percent by weight of cured cashew nut shell resin, from about 5 to about 25 percent by weight of a nitrile rubber, from about 8 to about 30 percent by weight of a resin binder, from about 4 to about 20 percent by weight of a fiber selected from a group consisting of metal, glass, mineral, rock wool and refractory and from about 5 to about 18 percent of a substantially carbon material.

2. The elastomeric sound damping material of claim 1 in which said resin binder is phenolic.

3. The elastomeric sound damping material of claim 1 in which said resin binder is cashew nut shell resin.

4. The elastomeric sound damping material of claim 1 in which said fibers are glass.

5. The elastomeric sound damping material of claim 1 in which said fibers are rock wool.

6. The elastomeric sound damping material of claim 1 in which said fibers are processed mineral fibers.

7. The elastomeric sound damping material of claim 1 in which said fibers are refractory material.

8. The elastomeric sound damping material of claim 1 in which said fibers are iron.

9. The elastomeric sound damping material of claim 1 in which the balance is fillers.

10. The elastomeric sound damping material of claim 9 in which said filler is calcium carbonate.

11. The elastomeric sound damping material of claim 9 in which said filler is barium sulphate.

12. The elastomeric sound damping material of claim 1 in which said carbon material is graphite.

13. The elastomeric sound damping material of claim 1 in which said carbon material is coke.

14. The elastomeric sound damping material of claim 1 in which said carbon material is coal particles.

15. The elastomeric sound damping material of claim 1 in which said carbon material is carbon black.

* * * * *